US010638505B1

(12) United States Patent
Manchanda et al.

(10) Patent No.: US 10,638,505 B1
(45) Date of Patent: Apr. 28, 2020

(54) SYSTEMS AND METHODS FOR ALLOCATING UPLINK RESOURCES TO RELAY NODES IN A WIRELESS NETWORK

(71) Applicant: Sprint Spectrum LP, Overland Park, KS (US)

(72) Inventors: Nitesh Manchanda, Overland Park, KS (US); Sreekar Marupaduga, Overland Park, KS (US); Vanil Parihar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/884,774

(22) Filed: Jan. 31, 2018

(51) Int. Cl.
*H04W 72/14* (2009.01)
*H04W 28/02* (2009.01)
*H04B 7/155* (2006.01)

(52) U.S. Cl.
CPC ........ *H04W 72/14* (2013.01); *H04B 7/15507* (2013.01); *H04W 28/0278* (2013.01)

(58) Field of Classification Search
CPC .............. H04W 72/14; H04W 28/0278; H04B 7/15507
USPC .......................................................... 370/315
See application file for complete search history.

(56) References Cited

U.S. PATENT DOCUMENTS

| 8,488,515 | B2 | 7/2013 | Lee et al. | |
|---|---|---|---|---|
| 2004/0209620 | A1* | 10/2004 | Gaal | H04W 72/14 455/450 |
| 2006/0182065 | A1* | 8/2006 | Petrovic | H04L 47/12 370/332 |
| 2007/0201397 | A1* | 8/2007 | Zhang | H04L 47/12 370/329 |
| 2010/0120442 | A1* | 5/2010 | Zhuang | H04B 7/15507 455/450 |
| 2010/0150082 | A1* | 6/2010 | Shin | H04W 72/1284 370/329 |
| 2017/0208591 | A1* | 7/2017 | Rico Alvarino | H04W 4/70 |
| 2018/0070264 | A1* | 3/2018 | Saiwai | H04W 72/04 |

* cited by examiner

*Primary Examiner* — Stephen J Clawson

(57) ABSTRACT

A system for allocating uplink resources to relay nodes in a wireless network includes an access node configured to deploy a first radio air interface. The system also includes a relay node configured to attach to the first radio air interface and to deploy a second radio air interface to which one or more end-user wireless devices are attached. The system further includes one or more other end-user wireless devices attached to the first radio air interface. The system further includes a processor configured to determine a type of traffic related to the one or more end-user wireless devices served by the relay node. The processor is further configured to selectively issue an extended uplink grant to the relay node based on the type of traffic.

19 Claims, 12 Drawing Sheets

| LCG ID | BUFFER SIZE |
|---|---|

FIG. 6A

| BUFFER SIZE #0 | | BUFFER SIZE #1 |
|---|---|---|
| BUFFER SIZE #1 | BUFFER SIZE #2 | |
| BUFFER SIZE #2 | BUFFER SIZE #3 | |

FIG. 6B

SYSTEMS AND METHODS FOR ALLOCATING UPLINK RESOURCES TO RELAY NODES IN A WIRELESS NETWORK

TECHNICAL BACKGROUND

Wireless networks incorporating access nodes, relay nodes, and other small-cell access nodes are becoming increasingly common, and may be referred to as heterogeneous networks. An access node may serve a coverage area, region, or sector having one or more relay nodes and one or more end-user wireless devices that are directly connected with the access node without using a relay node (hereinafter "directly connected end-user wireless devices"). A relay node may serve one or more end-user wireless devices that are indirectly connected with the access node through the relay node.

Relay nodes improve service quality by relaying communication between the access node and one or more end-user wireless devices in the wireless network that are indirectly connected with the access node through the relay nodes. For example, relay nodes may be used at the edge of a coverage area of an access node to improve and/or extend coverage and service, as well as in crowded areas having a high number of end-user wireless devices to increase the available throughput to the end-user wireless devices being relayed by the relay nodes. The access node may be referred to as a "donor" access node. Relay nodes are generally configured to communicate with the "donor" access node via a wireless backhaul connection, and to deploy a radio air interface to which end-user wireless devices can attach. Donor access nodes generally include scheduling modules or schedulers for scheduling or allocating resources to wireless devices directly connected thereto, as well as to the relay nodes connected to the donor access nodes through the wireless backhaul connection.

When an access node serves both relay nodes and directly connected end-user wireless devices, the access node may treat a relay node in the same way as it treats a directly connected end-user wireless device when allocating uplink resources. In other words, in a conventional wireless network, a relay node competes for uplink resources like any other directly connected end-user wireless devices. A conventional uplink resource allocation scheme employed by a conventional wireless network may not provide satisfactory user experience to the end-users through the relay node, when the relay node is serving GBR related traffic (e.g., VoLTE) that may require reduced latency.

Overview

Exemplary embodiments described herein include systems, methods, and processing nodes for scheduling or allocating uplink resources to relay nodes in a wireless network. An exemplary system described herein for allocating uplink resources to relay nodes in a wireless network includes an access node configured to deploy a first radio air interface. The system also includes a relay node configured to attach to the first radio air interface and to deploy a second radio air interface to which one or more end-user wireless devices are attached. The system further includes one or more other end-user wireless devices attached to the first radio air interface. The system further includes a processor configured to determine a type of traffic related to the one or more end-user wireless devices served by the relay node. The processor is further configured to selectively issue an extended uplink grant to the relay node based on the type of traffic.

An exemplary method described herein for allocating uplink resources to relay nodes in a wireless network includes determining a type of traffic related to one or more end-user wireless devices served by a relay node that is in wireless communication with an access node. The access node is also in wireless communication with one or more other end-user wireless devices that are not served by the relay node. The method also includes selectively issuing an extended uplink grant to the relay node based on the type of traffic.

An exemplary processing node described herein for allocating uplink resources to relay nodes in a wireless network is configured to perform operations including determining a type of traffic related to one or more end-user wireless devices served by a relay node that is in wireless communication with an access node. The access node is also in wireless communication with one or more other end-user wireless devices that are not served by the relay node. The operations also include selectively issuing an extended uplink grant to the relay node based on the type of traffic.

BRIEF DESCRIPTION OF THE DRAWINGS

FIG. 6A depicts an exemplary short buffer status report, in accordance with the disclosed embodiments.

FIG. 6B depicts an exemplary long buffer status report, in accordance with the disclosed embodiments.

DETAILED DESCRIPTION

Figure 1:
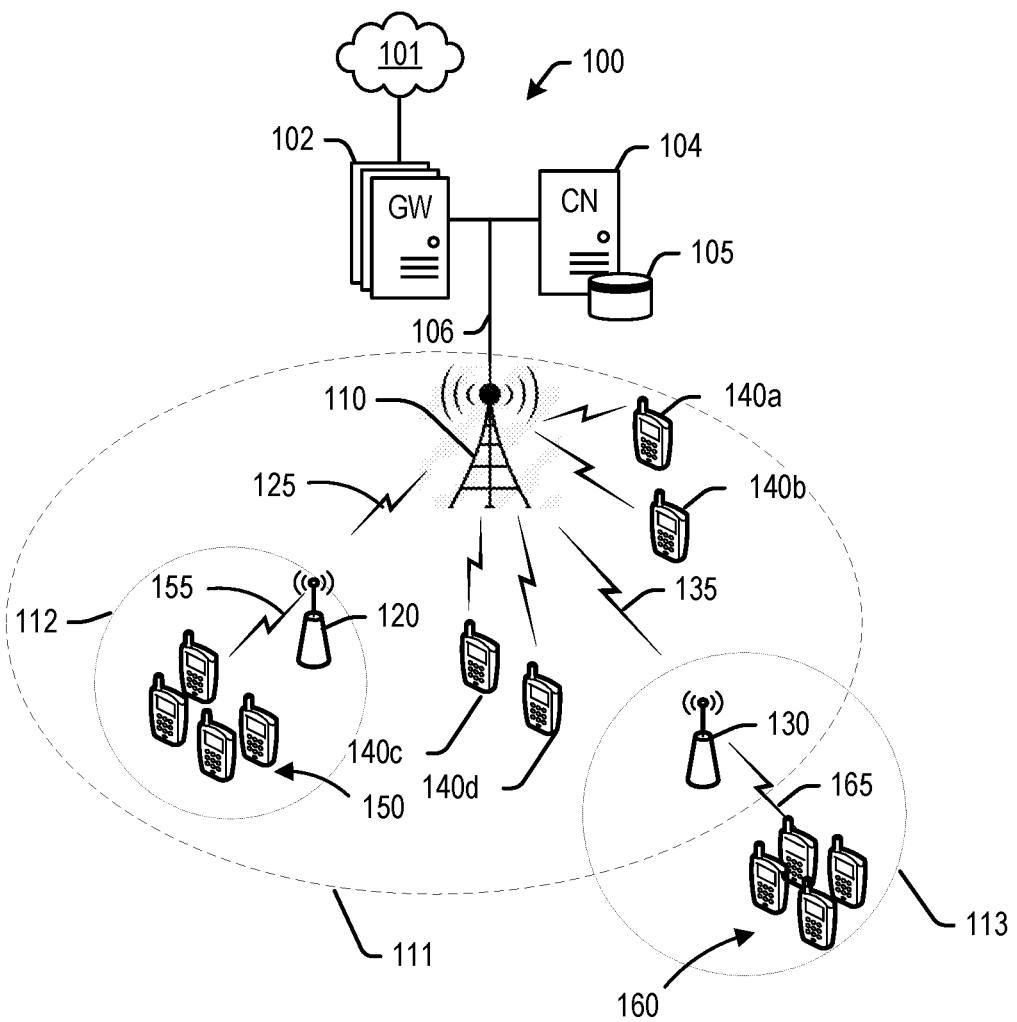
FIG. 1 depicts an exemplary system for scheduling resources for relay nodes in a wireless network, in accordance with the disclosed embodiments.

Exemplary embodiments described herein include systems, methods, and processing nodes for allocating uplink resources to relay nodes based on a type of traffic served by the relay nodes. The type of traffic may include Guaranteed Bit Rate (GBR) traffic and non-GBR traffic. Examples of GBR traffic may include VoLTE, conversational voice, conversational video (live streaming), and real time gaming.

Examples of non-GBR traffic may include IMS signaling, voice, video (live streaming), and TCP-based video (e.g., www, email, chat, ftp, etc.).

An exemplary system described herein includes at least a donor access node, such as an eNodeB, a relay node in wireless communication with the donor access node and serving one or more end-user wireless devices, and one or more directly connected end-user wireless devices that are in direct communication (i.e., without using a relay node) with the donor access node. The relay node may be configured to relay data packets between the donor access node and an end-user wireless device served by the relay node.

In some embodiments, a relay node may include a first component for communicating with the donor access node via a wireless backhaul connection and a second component for deploying a wireless air interface. End-user wireless devices can attach to the wireless air interface deployed by the relay node to access network services provided by the donor access node. For example, the first component may include a wireless device for communicating with the donor access node via the backhaul (hereinafter, the first component may be referred to as "relay wireless device" or "relay user equipment" or "Relay UE"). The second component may include a small-cell access node (hereinafter the second component may be referred to as "relay access point"), which may communicate with end-user wireless devices that rely on the relay node for communicating with the donor access node. Alternatively, the first and second components may be combined into a single relay node device.

In a conventional wireless network, a relay node competes for uplink resources as if it were a directly connected end-user wireless devices. In other words, the relay node is not treated differently than a directly connected end-user wireless device when the access node issues uplink grants. A conventional uplink resource allocation scheme employed by a conventional wireless network may allocate uplink resources (via uplink grants) to relay nodes in the same way as it allocates uplink resources (via uplink grants) to directly connected end-user wireless devices. A regular uplink grant may be issued to the relay node in a conventional wireless network. The term "regular uplink grant" means an uplink grant issued to a relay node as if the relay node were a directly connected end-user wireless device. Often times, a relay node may serve end-user wireless devices that have a mix of GBR and non-GBR data traffic. Some GBR related traffic may require reduced latency. The conventional uplink resource allocation scheme, which does not allocate additional uplink resources to the relay node, may not satisfy the reduce latency requirement of the GBR traffic.

When a relay node receives data from one or more end-user wireless devices for transmitting to the access node, the relay node stores the data in a buffer. The relay node sends a buffer status report (BSR) for a specific logical channel group (LCG) (via short BSRs) or for all of the LCGs (via long BSRs) to the access node and waits for the access node to issue an uplink grant. An uplink grant is a message issued by an access node to a relay node or an end-user wireless device. The uplink grant indicates whether the relay node or end-user wireless device has the permission to transmit data to the access node. The uplink grant also specifies or allocates the uplink resources the relay node or end-user wireless device may use for transmitting the data.

FIG. 6A and FIG. 6B illustrate exemplary structures of short and long buffer status reports, respectively. The short buffer status report shown in FIG. 6A includes a buffer size field for indicating whether the relay node has data to transmit to the access node, and if it has data to transmit, the size of the data. The buffer size field may have 6 bits or any other suitable size. When the buffer size field has 6 bits, it represents an integer value between 0 and 63, with 0 indicating no data to transmit, and each other non-zero value indicating a range of buffer size. For the short BSR, as shown in FIG. 6A, there is also an LCG ID field for indicating to which LCG (e.g., 0, 1, 2, or 3) the BSR is related. For the long BSR, as shown in FIG. 6B, there are multiple buffer size fields, each related to an LCG. In the example shown in FIG. 6B, there are 4 buffer size fields corresponding to 4 LCGs. For example, buffer size #0 may be related to LCG 0, buffer size #1 may be related to LCG 1, buffer size #2 may be related to LCG 2, and buffer size #3 may be related to LCG 3.

In certain scenarios, for example, due to poor transmission signal conditions or other reasons, the buffer status report may be lost in the transmission. If the buffer status report is lost (i.e., the access node does not receive it), in a conventional uplink resource allocation scheme, the access node not respond to the lost buffer status report, and hence does not issue an uplink grant. The relay node has to wait for a predetermined time before it can send a subsequent buffer status report to the access node. For example, when the relay node is periodically sending buffer status reports to the access node, the predetermined time may correspond to the time interval at which the relay node periodically sends buffer status reports. In some embodiments, the predetermined time may be 320 milliseconds (ms), or any other suitable amount of time. If the subsequent buffer status report is not lost, the access node may analyze the subsequent buffer status report and issue an uplink grant to the relay node if the buffer status report indicates the relay node has data to transmit. After receiving the uplink grant, the relay node may transmit data to the access node using the uplink resources allocated by the access node in the uplink grant. The predetermined time (e.g., 320 ms) that the relay node has to wait between sending two consecutive buffer status reports may increase the latency, resulting in unsatisfactory performance for GBR traffic that the relay node serves.

In some other scenarios (hereinafter "zero and non-zero buffer status reports out of order scenario"), the relay node may first transmit a non-zero buffer status report that indicating data to transmit and then transmit a zero buffer status report indicating no data to transmit. Due to transmission problems or various other reasons, the non-zero buffer status report may reach the access node later than the zero buffer status report. The access node may process the zero buffer status report first, and determines that there is no need to issue an uplink grant since there is no data for the relay node to transmit. After the zero buffer status report is processed, the access node may process the non-zero buffer status report and issue an uplink grant. In other words, the relay node has to wait until both of the zero and non-zero buffer status reports are processed before it can transmit data to the access node. This unnecessary wait time caused by the zero and non-zero out of order scenario can increase the latency and degrade the performance of the relay node.

The disclosed systems and methods eliminate or reduce the unnecessary wait time that the relay node has to wait in at least the above-described scenarios by adopting an extended uplink resource allocation scheme. The extended uplink resource allocation scheme includes issuing extended uplink grants to a relay node when the relay node serves GBR traffic, or was serving GBR traffic, as determined from the current and/or one or more previous buffer status reports. From the buffer status reports, the access node knows which LCG or LCGs the buffer status report is related to. Based on a mapping between the LCGs and QoS Class Identifier (QCI), the access node knows the QCI related to each of the LCGs. Based on the QCI, the access node knows whether the relay node is serving GBR traffic since each QCI is assigned to certain GBR traffic or non-GBR traffic.

The term "extended uplink grant" may mean an uplink grant that has additional or extra uplink resources as compared to a conventional or regular uplink grant issued to the relay node in a conventional uplink resource allocation scheme that treats relay nodes in the same manner as directly connected end-user wireless devices in terms of allocating uplink resources. For example, assuming the uplink resources allocated to a relay node by a regular uplink grant in response to a buffer status report is represented by $R_r$, an extended uplink grant may include $R_r+R_e$ uplink resources, where the extra uplink resources $R_e$ may be used by the relay node to transmit data indicated in a subsequent buffer status report even before an uplink grant is received from the access node in response to the buffer status report.

In some embodiments, the extra uplink resources may be additional uplink resources than what is requested in a buffer status report. For example, when the buffer status report indicates that the relay node has a certain amount of data to transmit, the access node may issue an extended uplink grant that allocates 10%, 20%, 30%, or 50% (or any other suitable number) more uplink resources than needed by the amount of data indicated in the buffer status report. In some embodiments, the extra uplink resources may be determined based on the current or the last non-zero buffer status report and the Physical Uplink Shared Channel resources already used or available for allocation.

In some embodiments, the term "extended uplink grant" may also mean repeatedly issuing, by the access node, an uplink grant at a predetermined time interval, which may be a fraction of a predetermined time period that the relay node has to wait between two consecutive buffer status reports, as in a conventional uplink resource allocation scheme. For example, if in a conventional uplink resource allocation scheme the relay node periodically sends buffer status reports to the access node at a predetermined time period of T ms, the relay node has to wait for T ms between two consecutive buffer status reports. In the disclosed extended uplink resource allocation scheme, the extended uplink grant may mean repeatedly issuing an uplink grant every T/n ms (or any other suitable interval that is a fraction of T), which is shorter than T. This means the uplink grants are issued more frequently than in a conventional uplink resource allocation scheme. The repeatedly issued uplink grant may be a regular uplink grant or an extended uplink grant that has extra uplink resources than a regular uplink grant.

For example, the relay node may periodically send, at every 320 ms (T=320 ms), a buffer status report to the access node. If one buffer status report is lost in transmission (or even if it is not lost), the relay node has to wait for 320 ms before it can send another buffer status report. According to the present disclosure, in one embodiment, the access node automatically issues uplink grants at a reduced time period that is a fraction of the time period T, such that the frequency of issuing the uplink grants is increased. With the increased frequency of issuing the uplink grants, when a buffer status report is lost in transmission, the relay node does not have to wait for time period T ms before it can send another buffer status report. Instead, the relay node may only have to wait T/n ms or less. The relay node may start transmitting data earlier than it would in a regular uplink resource allocation scheme (e.g., sooner than 320 ms).

The number n can be any suitable number. For example, n may be 2, 3, 4, 5, 6, 7, 8, etc. Correspondingly, when T is 320 ms, the uplink grants may be repeatedly issued at about every 160 ms, 106 ms, 80 ms, 64 ms, 53 ms, 45 ms, 40 ms, etc. In some embodiments, the time interval for repeatedly issuing the uplink grants may be slightly adjusted from T/n. For example, access node may repeatedly issue uplink grants at every (T/n−1) ms, (T/n−2) ms, (T/n−3) ms or any other suitable variations. In the above examples, when (T/n−2) ms is used, the access node may repeatedly issue uplink grants at about every 158 ms, 104 ms, 78 ms, 62 ms, 51 ms, 43 ms, and 38 ms, etc. In one embodiment, the access node automatically issues uplink grants every 62 ms. In these embodiments, the uplink grants are issued more frequently (e.g., 5 times more frequent) than in a regular uplink resource allocation scheme.

In some embodiments, the repeatedly issued uplink grants may be issued regardless of whether a buffer status report is lost. For example, when the access node determines that the relay node is or was transmitting GBR traffic, the access node may increase the frequency of issuance of the uplink grant from, e.g., about every 320 ms to about every 62 ms. The increased frequency may be maintained throughout a communication session, regardless of whether a buffer status report is lost. In some embodiments, the repeatedly issued uplink grants may be issued only when the access node determines or detects that the buffer status report is likely lost in transmission. For example, if the relay node sends buffer status reports to the access node at a predetermined scheduled time (e.g., at about 320 ms), but the access node has not received a buffer status report about 320 ms since the receipt of the last buffer status report, the access node may determine that the buffer status report has been lost. The access node may start issuing uplink grants at every 62 ms (or any other suitable time interval that is smaller than 320 ms) upon detection of the loss of the buffer status report. In some embodiments, the repeated issuance of the uplink grants at every 62 ms may be repeated up to 5 times and the access node may return to issuing the uplink grant in response to receiving a non-zero buffer status report.

In some embodiments, an extended uplink grant may be issued to only relay nodes connected to the access node that are serving GBR traffic, and not to the directly connected end-user wireless devices. The directly connected end-user wireless devices may receive regular uplink grants based on a regular uplink resource allocation scheme. In a network sector that includes only a small number (e.g., 1 or 2) of relay nodes serving GBR traffic, allocating extra uplink resources in an extended uplink grant may not increase the load of the system significantly.

In some embodiments, the access node may determine whether to start or trigger issuing extended uplink grants based on the current and/or the previous N (a predetermined non-negative integer number, e.g., 1, 2, 3, etc.) buffer status reports that indicate the relay node is or was serving GBR related traffic. When the current buffer status report indicates that the relay node is serving GBR traffic, the access node may determine to start issuing extended uplink grants to the relay node. In some embodiments, when the current buffer status report does not indicate that the relay node is serving GBR traffic, but the previous N (N being predetermined, e.g., 1, 2, 3, etc.) buffer status reports indicate that the relay node was serving GBR traffic, the access node may determine that the relay node will likely be serving GBR traffic in subsequent buffer status reports. Accordingly, the access node may determine to start issuing extended uplink grants to the relay node in order to better serve the potential GBR traffic included in the subsequent buffer status reports.

After the access node determines to start issuing extended uplink grants to the relay node, the access node starts issuing extended uplink grants to the relay node. At a predetermined time interval, e.g., 1 minute, 2 minutes, 10 minutes, 30 minutes, etc., the access node may dynamically analyze the previous N (N being an integer number, with 0 indicating the current buffer status report) buffer status reports to determine whether to stop issuing extended uplink grants to the relay node. If the access node determines that the previous N buffer status reports do not indicate that the relay node is or was serving GBR traffic, the access node may stop issuing extended uplink grants (if it was issuing extended uplink grants) or may not start issuing extended uplink grants (if it has not started issuing extended uplink grants). The predetermined time interval for dynamically analyzing the buffer status reports to determine whether to trigger or stop issuing extended uplink grants may be dynamically adjusted. For example, the predetermined time interval may be changed from 30 minutes to 10 minutes, depending on the analysis results and/or the traffic condition. In some embodiments, when there is a constant flow of GBR traffic, the predetermined time interval may be longer than when there is only a sparse flow of GBR traffic.

When the access node does not issue or stops issuing extended uplink grants (e.g., when the relay node is not serving GBR traffic), the access node may issue regular uplink grants to the relay node, treating the relay node as if it were a directly connected end-user wireless device.

Accordingly, in some embodiments, the access node may switch between a regular uplink resource allocation scheme (in which regular uplink grants are issued to the relay node) and an extended uplink resource allocation scheme (in which extended uplink grants are issued to the relay node). The switch may be triggered based on a determination of whether GBR traffic is or was indicated in the previous N (with N=0 indicating the current) buffer status reports received from the relay node.

In some embodiments, the extended uplink allocation scheme may be static. The term "static" means once the access node determines that the relay node is transmitting GBR data, and start issuing the extended uplink grants, the issuance of the extended uplink grants may continue for a relatively long time period until a communication session with the relay node terminates. This one-time determination may be made by analyzing the current buffer status report received from the relay node. If the current buffer status report does not indicate that the type of traffic served by the relay node includes GBR traffic, the access node does not start issuing extended uplink grants (i.e., the access node issues regular uplink grants instead) until it detects GBR traffic from a current buffer status report.

In addition to the systems and methods described herein, the operations for scheduling resources for the relay nodes may be implemented as computer-readable instructions or methods, and processing nodes on the network for executing the instructions or methods. For example, a processing node coupled to a donor access node, a scheduler within the donor access node, a scheduler in a relay node, or a controller node may be configured to perform the operations described herein. These and other embodiments are further described below.

FIG. 1 depicts an exemplary system for scheduling or allocating uplink resources for relay nodes in a wireless network. System 100 may include a communication network 101, a gateway 102, a controller node 104, and an access node 110. Access node 110 may serve one or more relay nodes 120 and 130, and one or more end-user wireless devices. One or more end-user wireless devices may be directly connected to access node 110, such as end-user wireless devices 140a, 140b, 140c, and 140d. One or more end-user wireless devices may be indirectly connected to access node 110 through relay nodes 120 and 130, such as end-user wireless devices 150 and 160.

In the exemplary embodiment shown in FIG. 1, access node 110 may be a macro-cell access node configured to deploy a wireless air interface over a coverage area 111. Each of relay nodes 120, 130, and each of end-user wireless devices 140a, 140b, 140c, and 140d may be attached to the wireless air interface deployed by access node 110. Relay nodes 120 and 130 may be configured to communicate with access node 110 over wireless communication links 125 and 135, respectively (hereinafter, "wireless backhaul" or "backhaul"). Relay nodes 120 130 may be further configured to deploy additional wireless air interfaces over coverage areas 112 and 113, respectively. Wireless devices 150 may be configured to attach to the wireless air interface deployed by relay node 120, and wireless devices 160 may be configured to attach to the wireless air interface deployed by relay node 130.

In some embodiments, wireless devices 150, 160 may access network services using the combination of relay nodes 120, 130, wireless backhaul links 125, 135, and access node 110. In some embodiments, wireless devices 140a, 140b, 140c, and 140d may access network services by directly connecting to access node 110. As shown in FIG. 1, wireless devices 160 are illustrated as being located outside of coverage area 111 of access node 110. Wireless devices 160 may access network services from access node 110 by connecting to relay node 130. In this configuration, access node 110 may be referred to as a "donor" access node. In other embodiments, any other combination of donor access nodes, relay access nodes, and carriers deployed therefrom may be evident to those having ordinary skill in the art in light of this disclosure.

Access node 110 may be any network node configured to provide communication between end-user wireless devices 140a, 140b, 140c, 140d, 150, 160 and communication network 101, including standard access nodes such as a macro-cell access node, a base transceiver station, a radio base station, an eNodeB device, an enhanced eNodeB device, or the like. In an exemplary embodiment, a macro-cell access node 110 may have a coverage area 111 in the range of approximately five kilometers to thirty-five kilometers and an output power in the tens of watts. Relay nodes 120, 130 may include short range, low power, small-cell access nodes such as a microcell access node, a picocell access node, a femtocell access node, or a home eNodeB device. In addition, relay nodes 120, 130 may include a small-cell access node paired with a relay wireless device configured to communicate over one of wireless backhaul links 125, 135, respectively.

Access node 110 and relay nodes 120, 130 may each include a processor and associated hardware circuitry configured to execute or direct the execution of computer-readable instructions to perform operations such as those described herein. In some embodiments, access node 110 and relay nodes 120, 130 may retrieve and execute software from a storage device, which may include a disk drive, a flash drive, a memory circuitry, or other memory device, and which may be local or remotely accessible. The software may include computer programs, firmware, or other form of machine-readable instructions, and may include an operating system, utilities, drivers, network interfaces, applications, or other type of software, including combinations thereof. Access node 110 and relay nodes 120, 130 may receive instructions and other input at a user interface. Access node 110 may communicate with gateway 102 and controller node 104 via a communication link 106. Access node 110 and relay nodes 120, 130 may communicate with each other, and other access nodes (not shown), using a wireless link or a wired link such as an X2 link. Components of access node 110 and relay nodes 120, 130 are further described with reference to FIGS. 2-5.

Wireless devices 140a, 140b, 140c, 140d, 150, 160 may be any device, system, combination of devices, or other such communication platform configured to wirelessly communicate with access node 110 and/or relay nodes 120, 130 using one or more frequency bands deployed therefrom. Wireless devices 140a, 140b, 140c, and 140d may be directly communicating with access node 110 without using a relay node, whereas wireless devices 150 and 160 may be indirectly communicating with access node using relay nodes 120 and 130. Each of wireless devices 140a, 140b, 140c, 140d, 150, 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that may send and receive signals or data. Other types of communication platforms are contemplated.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by wireless devices 150, 160. Wireless network protocols may include one or more of Multimedia Broadcast Multicast Services (MBMS), code division multiple access (CDMA) 1xRTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof.

Communication link 106 may use various communication media, such as air, laser, metal, optical fiber, or other signal propagation path—including combinations thereof. Communication link 106 may be wired or wireless and may use various communication protocols such as Internet, Internet protocol (IP), local-area network (LAN), optical networking, hybrid fiber coax (HFC), telephony, T1, or other communication format—including combinations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. In some embodiments, communication link 106 may include S1 communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE), and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a stand-alone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE), and may be used with any network architecture and/or protocol.

Controller node 104 may include a processor and associated hardware circuitry configured to execute or direct the execution of computer-readable instructions to obtain information. Controller node 104 may retrieve and execute software from a storage device, which may include a disk drive, a flash drive, a memory circuitry or device, and which may be local or remotely accessible. In an exemplary embodiment, controller node 104 may include a database 105 configured for storing information related to elements within system 100, such as configurations and capabilities of relay nodes 120, 130, resource requirements of end-user wireless devices 140a, 140b, 140c, 140d, 150, and 160, priority levels associated therewith, and so on. The information may be requested by or shared with access node 110 via communication link 106, X2 connections, and so on. The software may include computer programs, firmware, or other form of machine-readable instructions, and may include an operating system, utilities, drivers, network interfaces, applications, or other type of software, and combinations thereof. For example, a processing node may be included in controller node 104 and configured to perform the operations described herein, including operations relating to allocating uplink resources to relay nodes. In some embodiments, controller node 104 may receive instructions and other input at a user interface.

Other network elements may be included in system 100 and configured to facilitate communication but are omitted for clarity, such as base stations, base station controllers, mobile switching centers, dispatch application processors, and location registers such as a home location register or visitor location register. Furthermore, other network elements that are omitted for clarity may be included in system 100 to facilitate communication, such as additional processing nodes, routers, gateways, and physical and/or wireless data links for carrying data among the various network elements, e.g., between access node 110 and communication network 101.

Figure 2:
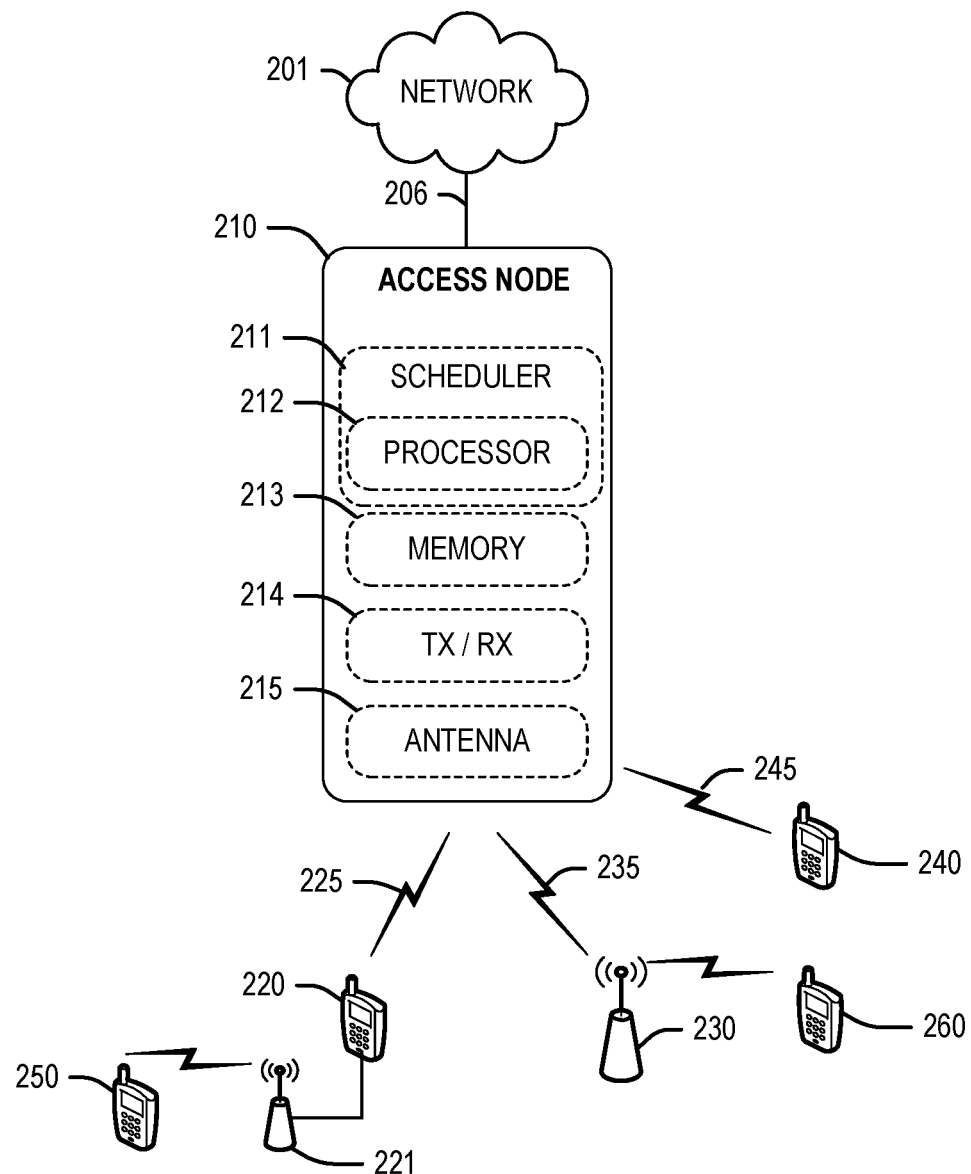
FIG. 2 depicts an exemplary access node, in accordance with the disclosed embodiments.

FIG. 2 depicts an exemplary access node 210. Access node 210 may include, for example, a macro-cell access node. Access node 210 may be an embodiment of access node 110 described with reference to FIG. 1. Access node 210 may include a scheduler 211, which may include a processor 212. Access node 210 may also include a memory 213, a transceiver 214, and an antenna 215. Scheduler 211 may be configured to schedule or allocate resources, including uplink resources, for relay nodes communicatively coupled to the access node. For example, processor 212 of scheduler 211 may be configured to execute instructions stored on memory 213 for performing various methods disclosed herein for scheduling resources, including uplink resources, for the relay nodes. Transceiver 214 and antenna 215 may be configured to enable wireless communication with a relay wireless device 220, a relay node 230, and an end-user wireless device 240. Relay wireless device 220 may communicate with access node 210 through wireless link 225. Relay node 230 may communicate with access node 210 through wireless link 235. End-user wireless device 240 may communicate with access node 210 through wireless link 240. Instructions stored on memory 213 may be accessed and executed by processor 212 to perform operations disclosed herein, such as deploying a wireless air interface via one or more of transceiver 214 and antenna 215. The operations performed by processor 212 may also include enabling relay wireless device 220, relay node 230, and end-user wireless devices 240 to access network services from network 201 via access node 210. The operations performed by processor 212 may further include enabling relay wireless device 220 to communicate with end-user wireless device 250 and a relay access point 221, and enabling relay wireless device 230 to communicate with end-user wireless device 260 and access node 210. Relay wireless device 220 and relay access point 221 may be referred to as a relay node. Although memory 213 is shown as separated from scheduler 211, in some embodiments, memory 213 may be included in scheduler 211. Alternatively, scheduler 211 may include an additional memory. In some embodiments, access node 210 may be referred to as a donor access node.

Figure 3:
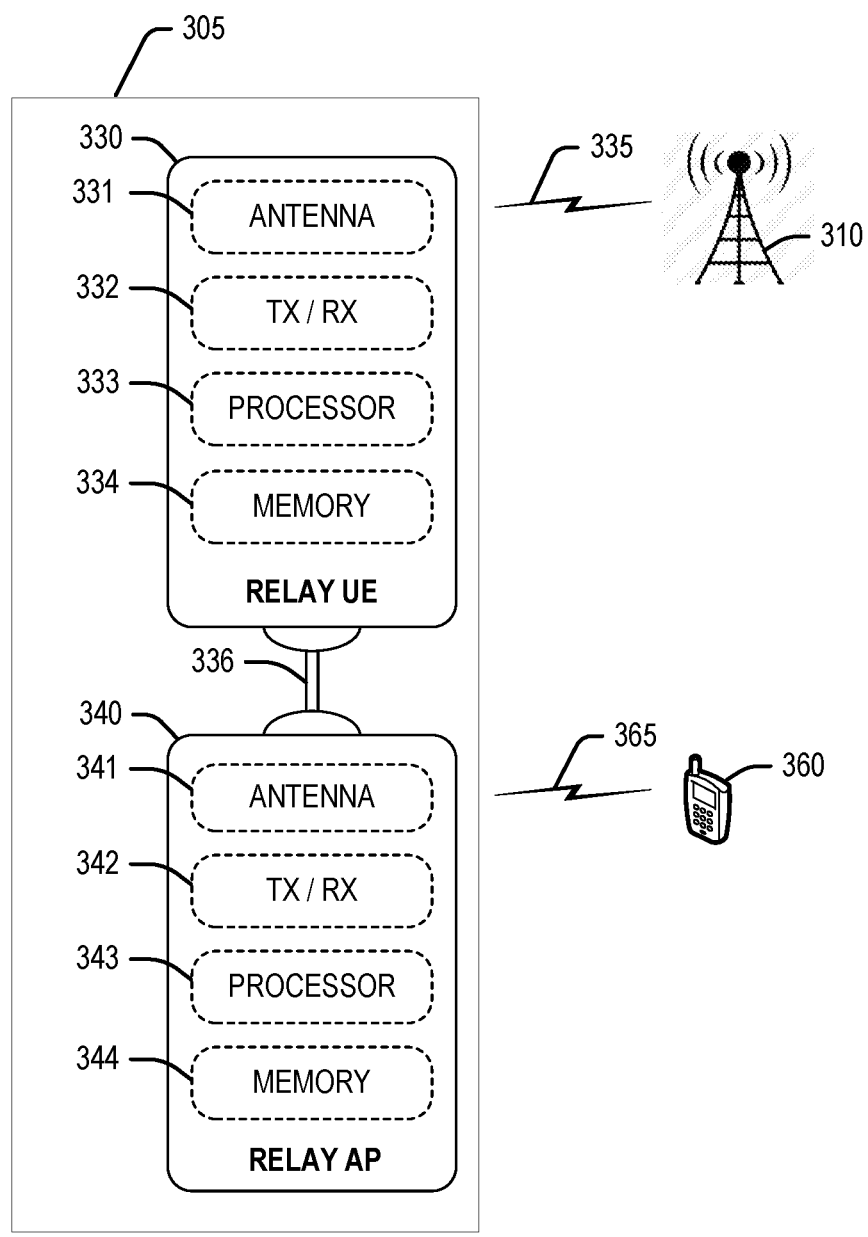
FIG. 3 depicts an exemplary relay node, in accordance with the disclosed embodiments.

FIG. 3 depicts an exemplary relay node 305 including a relay wireless device (relay user equipment or relay UE) 330 and a separate relay access point (relay AP) 340. Relay node 305 may be an embodiment of relay node 120 and/or 130. Relay wireless device 330 may include an antenna 331 for direct (i.e., unrelayed) communication with a donor access node 310 via a wireless backhaul link 335. Access node 310 may be an embodiment of access node 110 and/or access node 210. Relay wireless device 330 may also include a transceiver 332, a processor 333, and a memory 334 for storing instructions that enable relay wireless device 330 to perform operations described herein. In some embodiments, relay wireless device 330 may be referred to as a customer premise equipment (CPE), which may be a stationary LTE wireless device having a stronger computational & radio frequency capability versus standard wireless devices. Relay wireless device 330 may include a directional antenna and a dedicated power supply, enabling relay wireless device 330 to efficiently provide resources to wireless device 360 via relay access point 340 and a communication link 365. In some embodiments, relay access point 340 may be co-located with relay wireless device 330, and may be connected to relay wireless device 330 via a communication interface 336. In some embodiments, relay access point 340 and relay wireless device 330 may be included in a single device. Communication interface 336 may be a suitable interface that enables communication (e.g., direct communication) between relay wireless device 330 and relay access point 340, such as USB, FireWire, Ethernet, or any other serial, parallel, analog, or digital interface. In some embodiments, relay node 305 may be configured to perform functions similarly performed by an access node (e.g., access node 210). For example, in some embodiments, relay node 305 may include a scheduler configured to schedule resources for a plurality of wireless devices connected to relay node 305.

In operation, in some embodiments, relay wireless device 330 may be configured to relay network services from donor access node 310 to wireless device 360 via relay access point 340. Relay wireless device 330 may begin to function as a relay wireless device by sending a message to donor access node 310 to indicate that wireless device 330 is functioning as a relay wireless device. In some embodiments, relay wireless device 330 may request to send a buffer status report to donor access node 310. Donor access node 310 may grant this request. Relay wireless device 330 may respond to the grant by sending a short buffer status report. This short buffer status report may be associated with a logical channel group that indicates the buffer status report is communicating the status of relay wireless device 330 as a relay, and thus is not asking for additional resource allocations (as a conventional buffer status report would indicate). In other words, when relay wireless device 330 responds with a buffer status report for the special logical channel group, it means that the buffer status report is not actually reporting the status of a buffer. Rather, this buffer status report indicates that the wireless device is functioning as a relay. Once the status of relay wireless device 330 is established, relay wireless device 330 may instruct relay access point 340 to start accepting connection requests from one or more wireless devices such as wireless device 360.

Further, based on the indication of relay status, donor access node 310 may alter how relay wireless device 330 is treated. For example, relay wireless device 330 may be provided with preferential treatment because it is functioning as a relay. In some embodiments, a specific class indicator may be assigned to wireless backhaul link 335 between relay wireless device 330 and donor access node 310. The class indicator may be a QoS Class Identifier (QCI) that is different from other QCIs assigned to wireless devices that are directly connected to donor access node 310. In other embodiments, upon determining that a resource requirement or traffic type of wireless device 360 meets a threshold or other criteria, the class indicator of wireless backhaul link 335 may be adjusted to meet the resource requirement or provide an appropriate QoS for the traffic type.

Referring to FIG. 3, relay access point 340 is illustrated as having an antenna 341 and a transceiver 342 for enabling communication with wireless device 360, a processor 343, and a memory 344 for storing instructions that are executable by processor 343. In some embodiments, relay access point 340 may be a home eNodeB. Moreover, although only one transceiver is depicted in each of relay wireless device 330 and relay access point 340, additional transceivers may be incorporated in order to facilitate communication across communication interface 336 and other network elements. In operation, relay access point 340 may be configured to deploy a carrier by the combination of antenna 341 and transceiver 342, and enable wireless device 360 to attach thereto.

Figure 4:
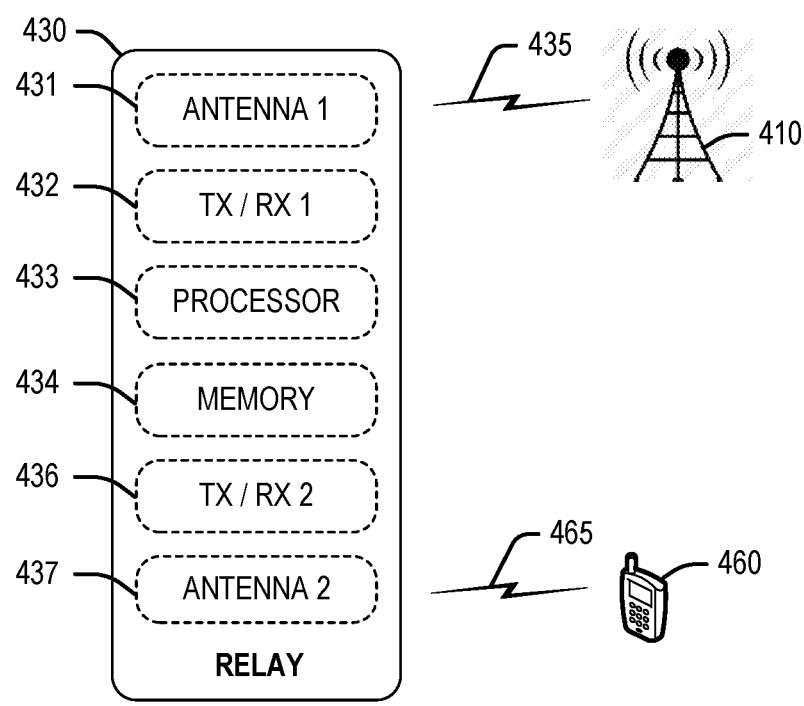
FIG. 4 depicts another exemplary relay node, in accordance with the disclosed embodiments.

In some embodiments, a relay node may integrate components of both a relay wireless device and a relay access point into a single unit. FIG. 4 depicts an exemplary relay node 430 according to this configuration. Relay node 430 may be an embodiment of relay node 120 and/or 130. Relay node 430 is illustrated as having a first antenna 431 for direct (i.e., unrelayed) communication with a donor access node 410 via a wireless backhaul link 435. Access node 410 may be an embodiment of access node 110, access node 210, and/or access node 310. Relay node 430 may include a first transceiver 432, a processor 433, and a memory 434 for storing instructions that are executable by processor 433 as described herein. Relay node 430 may further include a second transceiver 436 and a second antenna 437 for enabling communication with wireless device 460 via a wireless link 465. Relay node 430 may perform operations disclosed herein, including those described above with respect to FIG. 3. In some embodiments, relay node 430 may be configured to perform functions similarly performed by an access node. For example, relay node 430 may include a scheduler configured to schedule resources for a plurality of wireless devices connected to the relay node.

In some embodiments, the relay nodes depicted in FIG. 3-4 may be configured to function as one or more of a layer 1 (L1), layer 2 (L2), or layer 3 (L3) relay node. An L1 relay node functions as a booster or repeater. In other words, an L1 relay node performs an amplify and forward (AF) function. RF signals received from a donor access node are amplified and transmitted to end-user wireless devices by an L1 relay node. Likewise, RF signals received from end-user wireless devices are amplified and transmitted to donor access nodes by an L1 relay node. An L2 relay node performs a decode and forward (DF) function. RF signals received from a donor access node are demodulated and decoded, then encoded, modulated, and transmitted to a wireless device by an L2 relay node. Likewise, RF signals received from a wireless device are demodulated and decoded, then encoded, modulated, and transmitted to a donor access node by an L2 relay node. An L3 relay node performs a decode and forward function. An L3 relay node also performs additional processing, such as ciphering and/or data concatenation/segmentation/reassembly. In other words, a relay node depicted herein performs demodulation and decoding of the received RF signals (either uplink or downlink), processes received data, then encodes, modulates, and transmits the data between two communication devices. In some embodiments, a relay node may include functions that are similarly performed by an access node. For example, a relay node may include a scheduler that performs resource scheduling. The scheduler may include a processor (such as processor 333, 343, or 433) configured to perform the resource scheduling functions or operations disclosed herein.

Figure 5:
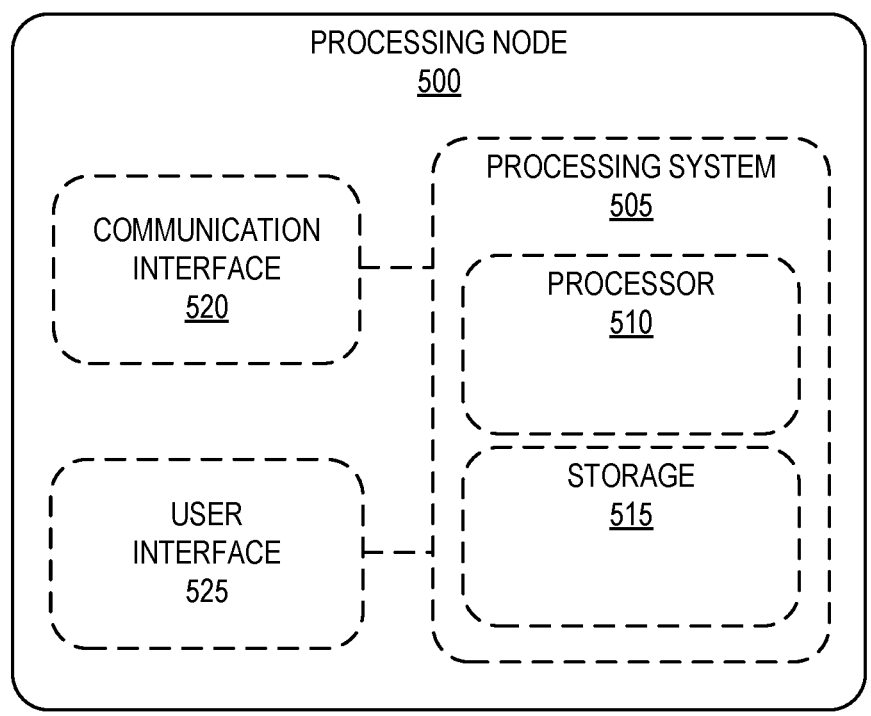
FIG. 5 depicts an exemplary processing node, in accordance with the disclosed embodiments.

FIG. 5 depicts an exemplary processing node 500, which may be configured to perform resource scheduling functions, including the methods and operations disclosed herein for scheduling or allocating uplink resources to relay nodes. In some embodiments, processing node 500 may be included in an access node, such as access node 110, 210, 310, or 410. For example, processing node 500 may be included in a scheduler (e.g., scheduler 211) included in the access node and configured to perform resource scheduling functions. In some embodiments, processing node 500 may be included in a relay node, such as relay node 120, 130, 220 and 221, 230, 305, or 430. For example, the relay node may also include a scheduler (not shown) that performs resource scheduling functions, and processing node 500 may be included in the scheduler. In some embodiments, processing node 500 may be included in a network node or device that is separately provided from the access node or the relay node. For example, processing node 500 may be included in controller node 104 or any other network node or device.

Processing node 500 may be configured for scheduling resources for relay nodes, wireless devices, and/or access nodes in a wireless network. Processing node 500 may include a processing system 505. Processing system 505 may include a processor 510 and a storage device 515. Storage device 515 may include a disk drive, a flash drive, a memory, or other storage device configured to store data and/or computer readable instructions or codes (e.g., software). The computer executable instructions or codes maybe accessed and executed by processor 510 to perform various methods disclosed herein. Software stored in storage device 515 may include computer programs, firmware, or other form of machine-readable instructions, including an operating system, utilities, drivers, network interfaces, applications, or other type of software. For example, software stored in storage device 515 may include a module for performing resource scheduling operations described herein. Processor 510 may be a microprocessor and may include hardware circuitry and/or embedded codes configured to retrieve and execute software stored in storage device 515.

Processing node 500 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to processing node 500 and receive data or information from processing node 500. User interface 525 may include hardware components, such as touch screens, buttons, displays, speakers, etc. Processing node 500 may further include other components such as a power management unit, a control interface unit, etc., which are omitted for clarity.

Figure 7:
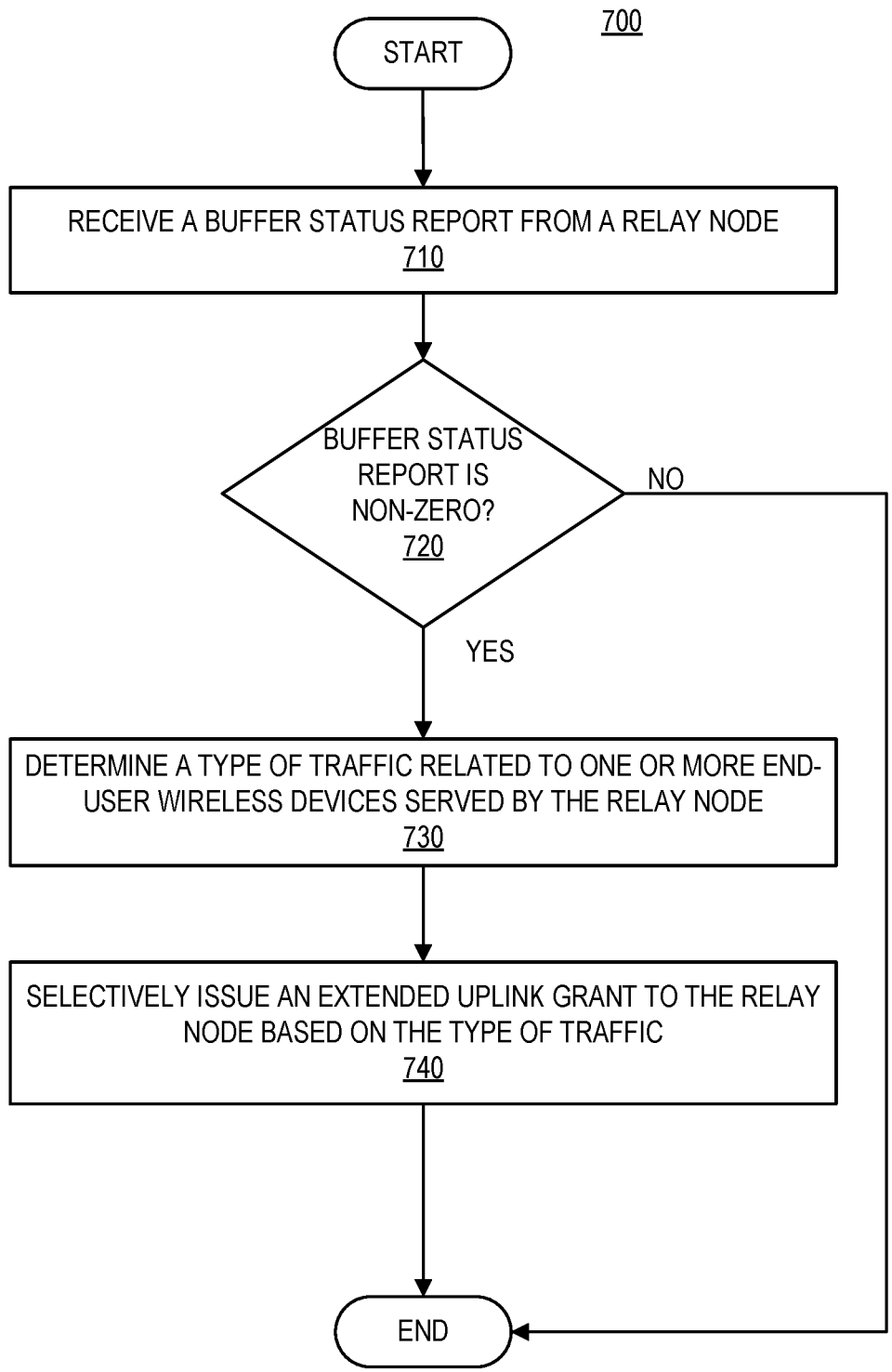
FIG. 7 depicts an exemplary method for allocating uplink resources to relay nodes in a wireless network, in accordance with the disclosed embodiments.

The disclosed methods for allocating uplink resources including issuance of uplink grants are discussed further below with reference to FIGS. 7-12. FIG. 7 illustrates an exemplary method for allocating uplink grants to a relay node, such as relay node 120, 130, 305, or 430. Method 700 may be performed by any suitable processor discussed herein, for example, a processor included in access node 110 (or 210, 310, 410), processor 510 included in processing node 500, or a processor included in control node 104. For discussion purposes, method 700 is described as being performed by a processor included in access node 110, and the relay node is represented by relay node 120.

Method 700 may include receiving, by the processor, a buffer status report from relay node 120 (step 710). Method 700 may also include determining whether the buffer status report is a non-zero buffer status report indicating that relay node 120 has data to transmit to the access node (step 720). When the processor determines that the buffer status report is not a non-zero buffer status report (No, step 720), method 700 may end, and access node 110 does not issue an uplink grant to relay node 120. When the processor determines that the buffer status report is a non-zero buffer status report (Yes, step 720), which means relay node 120 has data to transmit, the processor may determine a type of traffic related to one or more end-user wireless devices served by the relay node (step 730). For example, the processor may determine the type of traffic, e.g., whether the type is GBR or non-GBR, from a Quality of Service (QoS) Class Indicator (QCI) associated with the LCG or LCGs that the buffer status report is related to. The processor may selectively issue an extended uplink grant to relay node 120 based on the type of traffic (step 740). For example, when the type of traffic is non-GBR, access node 110 may not issue extended uplink grants to relay node 120. When the type of traffic is GBR, access node 110 may issue extended uplink grants to relay node 120.

In accordance with the conventional uplink resource allocation scheme, when a buffer status report sent by the relay node is lost in transmission, the access node does not receive it and hence does not issue an uplink grant. As a result, the relay node has to wait for a predetermined time period before it can send another buffer status report. For example, when the relay node is periodically transmitting buffer status reports to the access node at every 320 ms or any other time interval, if one buffer status report is lost, the relay node has to wait for 320 ms before it can send another buffer status report to the access node. This time delay (e.g., 320 ms) can increase the latency, making the performance of the relay node unsatisfactory for certain GBR related traffic.

To address this issue, according to the present disclosure, access node 110 may implement an extended uplink grant (or uplink resource allocation) scheme that issues extended uplink grants to the relay node when the access node determines that the relay node is or was serving GBR traffic. In some embodiments, issuing the extended uplink grants includes repeatedly issuing an uplink grant at an increased frequency, e.g., at a time interval (e.g., 62 ms) that is a fraction of the predetermined time period (e.g., 320 ms) that relay node 120 would have to wait in a conventional uplink resource allocation scheme, if relay node 120 were treated like a directly connected end-user wireless device. As a result, relay node 120 does not have to wait for the predetermined time period (e.g., 320 ms) to transmit the data in case a buffer status report is lost. When the uplink grants are repeatedly issued at an increased frequency, the wait time may be significantly reduced for relay node 120.

In some embodiments, issuing the extended uplink grants may include issuing an uplink grant that has additional or extra uplink resources (e.g., more resources than what relay node 120 has requested in the buffer status report, or than what relay node 120 would have been allocated in a regular uplink resource allocation scheme that treats relay node 120 as if it were a directly connected end-user wireless device). Relay node 120 may use the extra uplink resources to transmit data indicated in one or more subsequent buffer status reports after the subsequent buffer status reports are sent to access node 110, and before uplink grants corresponding to the subsequent buffer status reports are issued by access node 110.

In some embodiments, the extended uplink resource allocation scheme (including issuing the extended uplink grants) may be dynamic. For example, the access node may periodically (e.g., at a predetermined time interval, such as 5 minute, 10 minutes, etc.) determine whether to start or switch to the extended uplink resource allocation scheme. In some embodiments, at a certain time, the access node may analyze previous N (N being an integer number, e.g., 0, 1, 2, 3, etc., with 0 representing current buffer status report) buffer status reports to determine whether to use the extended uplink resource allocation scheme. The determination may be based on the type of traffic the relay node is serving as indicated in the buffer status reports. For example, when a current buffer status report indicates that relay node 120 is serving GBR traffic, or when the previous N buffer status reports indicate that relay node 120 was serving GBR traffic, and therefore, the relay node may likely have GBR data in the subsequent buffer status reports, access node 110 may determine to start or switch to the extended uplink resource allocation scheme.

When access node 110 determines to start the extended uplink resource allocation scheme for relay node 120 that serves GBR traffic, access node 110 starts issuing extended uplink grants to relay node 120 serving GBR traffic, while issuing regular uplink grants to the directly connected end-user wireless devices (e.g., 140*a*, 140*b*, 140*c*, 104*d*) and a relay node (e.g., 130) that does not serve GBR traffic (e.g., one that serves non-GBR traffic). When access node 110 determines not to start the extended uplink resource allocation scheme, access node 110 stops issuing extended uplink grants to relay node 120, and instead starts using a regular uplink resource allocation scheme by issuing regular uplink grants to relay node 120 (by treating relay node 120 as if it were a directly connected end-user wireless device in terms of issuing uplink grants). Thus, access node 110 may switch between the extended uplink resource allocation scheme and the regular uplink resource allocation scheme based on the type of traffic indicated in one or more buffer status reports.

In some embodiments, the extended uplink resource allocation scheme (including issuing the extended uplink grants) may be static (or semi-static) as compared to the dynamic feature discussed above. The static extended uplink resource allocation scheme is relatively static as compared to the dynamic extended uplink resource allocation scheme because the static scheme does not periodically check the buffer status report(s) for GBR traffic to determine whether to invoke or continue the extended uplink resource allocation scheme. In the static uplink resource allocation scheme, access node 110 may determine whether to use the extended uplink resource allocation scheme by analyzing the current buffer status report it receives from the relay node at a time point (e.g., at a beginning of a communication session with relay node 120). When the current status report indicates that relay node 120 is transmitting GBR data, access node 110 may decide to use the extended uplink resource allocation scheme by issuing the extended uplink grants to relay node 120, while issuing regular uplink grants to the directly connected end-user wireless devices. Once the extended uplink resource allocation scheme is implemented, the access node may continuously issuing extended uplink grants to the relay node until a criterion to stop issuing extended uplink grants is met. For example, the criterion may be a predetermined period of time (e.g., 30 minutes, 1 hour, 10 hours, etc.). In some embodiments, the criterion may be the termination of a communication session with relay node 120. Other suitable criterion may also be used to terminate the extended uplink resource allocation scheme.

When the extended uplink resource allocation scheme is terminated, access node 110 may switch to a regular uplink resource allocation scheme by issuing uplink grants to relay node 120 by treating relay node 120 as if it were a directly connected end-user wireless device. In some embodiments, after access node 110 switches to the regular uplink resource allocation scheme, access node 110 may switch back to the extended uplink resource allocation scheme when access node 110 determines that relay node 120 has been continuously transmitting GBR data for a predetermined time period. For example, if relay node 120 has been transmitting GBR data under the regular uplink resource allocation scheme for 5 minutes, 10 minutes, 30 minutes, etc., access node 110 may determine to switch back to the extended uplink resource allocation scheme.

Figure 8:
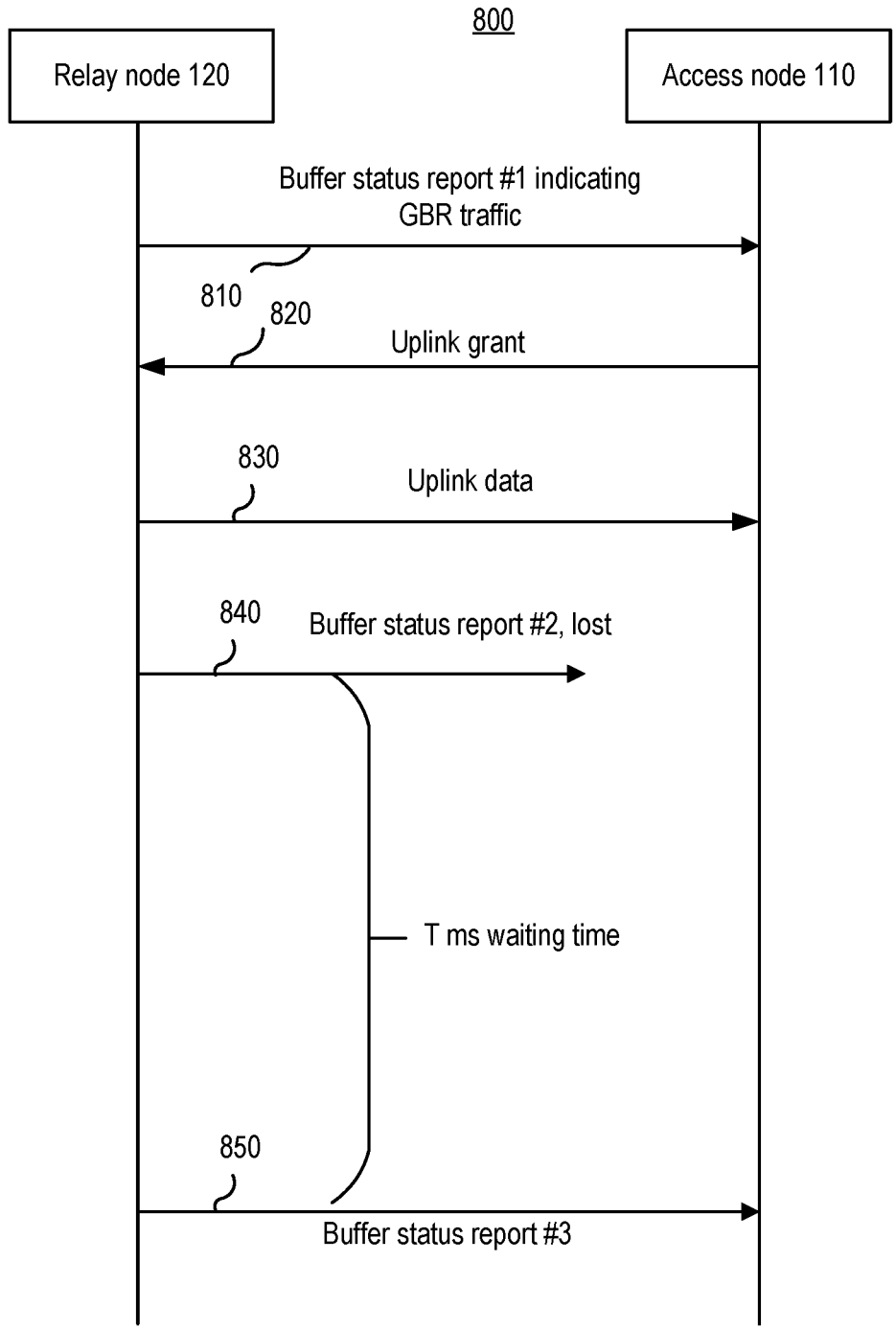
FIG. 8 depicts a conventional method for allocating uplink resources to relay nodes in a conventional wireless network.
Figure 9:
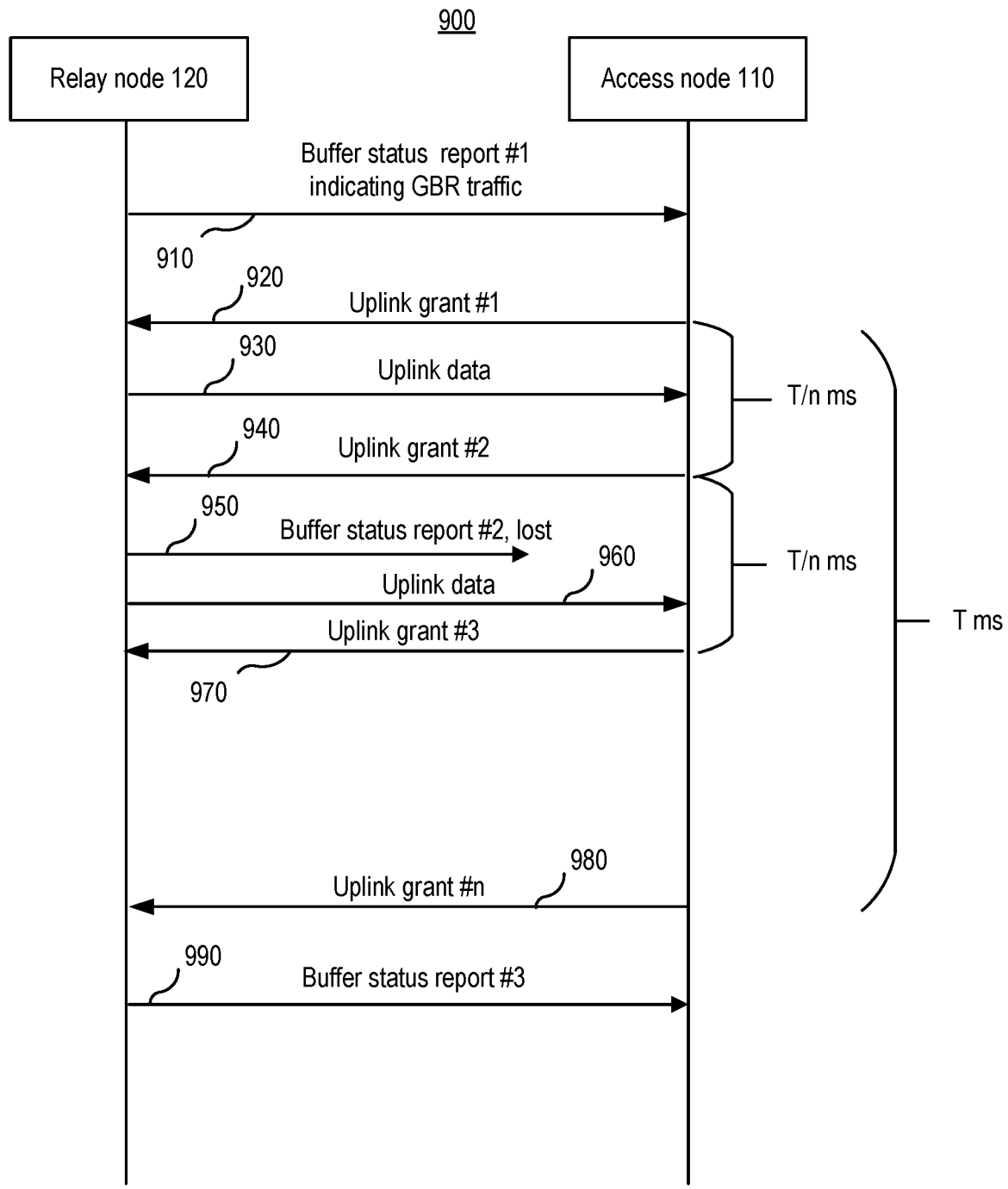
FIG. 9 depicts an exemplary method for allocating uplink resources to relay nodes in a wireless network, in accordance with the disclosed embodiments.

FIG. 8 illustrates a conventional uplink resource allocation scheme for issuing uplink grants to a relay node. FIG. 9 illustrates an extended uplink resource allocation scheme that issues extended uplink grants to a relay node, in accordance with an embodiment of the present disclosure. FIGS. 8 and 9 show the differences between the conventional uplink resource allocation scheme and the extended uplink resource allocation scheme using the scenario where a buffer status report is lost in transmission as an example.

As shown in FIG. 8, in a conventional uplink resource allocation scheme, relay node 120 sends a buffer status report #1 indicating that relay node 120 is serving GBR traffic to access node 110 (step 810). Access node 110 issues an uplink grant to relay node 120 (step 820). After receiving the uplink grant, relay node 120 transmits uplink data to access node 110 using uplink resources allocated in the uplink grant (step 830). Relay node 120 may send a buffer status report #2 to access node 110 (step 840), which may be lost in transmission. As a result, access node 110 does not receive the buffer status report #2, and hence does not issue an uplink grant to relay node 120. Having no uplink resources to use for transmitting data, relay node 120 has to wait for T ms (e.g., when relay node 120 is periodically sending buffer status reports to access node 110 at every time interval T ms) before it can send another buffer status report #3 to access node 110 (step 850). This waiting time (T ms) may cause increased latency, making the performance of relay node unsatisfactory for certain GBR traffic. In some embodiment, T ms may be 320 ms.

To reduce the latency and improve performance of relay node 120, the disclosed embodiments may reduce the wait time by increasing the frequency of issuing the uplink grants, as shown in FIG. 9. As shown in FIG. 9, relay node 120 may send a buffer status report #1 indicating GBR traffic to access node 110 (step 910). Access node 110 may determine from the buffer status report #1 which LCG(s) the buffer status report is related to. Based on the mapping between the LCG(s) and QCI, access node 110 may determine whether relay node 120 is serving GBR traffic. After determining that relay node 120 is serving GBR traffic, or after determining from previous N (e.g., 1, 2, 3, etc.) buffer status reports that relay node 120 was serving GBR traffic, access node 110 may start or switch to an extended uplink resource allocation scheme by issuing extended uplink grants to relay node 120 (while issuing regular uplink grants to directly connected end-user wireless devices and other relay nodes that do not serve GBR traffic).

In some embodiments, access node 110 may issue an uplink grant to relay node 120 at every T/n ms (increased frequency than every T ms), where T is the time interval relay node 120 would otherwise have to wait between two buffer status reports in a conventional uplink resource allocation scheme, as shown in FIG. 8, and n is an integer number, such as 2, 3, 4, 5, 6, etc. It is understood that T/n ms is only one example. Other suitable variations, including slight adjustments to this formula, may be used. For example, instead of issuing an uplink grant for every T/n ms, access node 110 may issue an uplink grant at every (T/n−1) ms, (T/n−2) ms, or (T/n−3) ms, etc. For discussion purposes, in the example shown in FIG. 9, T/n is used as the reduced uplink grant issuance time interval.

As shown in FIG. 9, access node 110 issues an uplink grant #1 (step 920). Relay node 120 may use the uplink resources specified in the uplink grant #1 to transmit uplink data to access node 110 (step 930). Regardless of whether access node 110 receives another buffer status report from relay node 120, access node 110 may automatically issue another uplink grant #2 (step 940) after T/n ms from the issuance of the uplink grant #1, and repeatedly issuing an uplink grant at every T/n ms. The uplink grant #2 may be automatically issued by access node 110, even if no corresponding buffer status report has been received. Relay node 120 may send a buffer status report #2 to access node 110 (step 950), which may be lost in transmission. Instead of waiting for T ms (e.g., 320 ms in one example), as shown in FIG. 8, in the scheme shown in FIG. 9, relay node 120 may start transmitting uplink data using the uplink resources specified in uplink grant #2 (step 960). Access node 110 may repeatedly issue an uplink grant (e.g., uplink grant #3, #4, . . . , # n) from steps 970 to 980 at every T/n ms. Thus, in the case where a buffer status report is lost in transmission, relay node 120 only has to wait no more than T/n ms. Relay node 120 may continue to send a buffer status report #3 to access node 110 (step 990). As shown in FIG. 9, between buffer status report #2 and buffer status report #3, unlike in the conventional uplink resource allocation scheme shown in FIG. 8, relay node 120 does not have to wait for T ms (e.g., 320) between buffer status reports. As a result, the disclosed extended uplink resource allocation scheme reduces the latency at relay node 120, thereby improving its performance.

Figure 10:
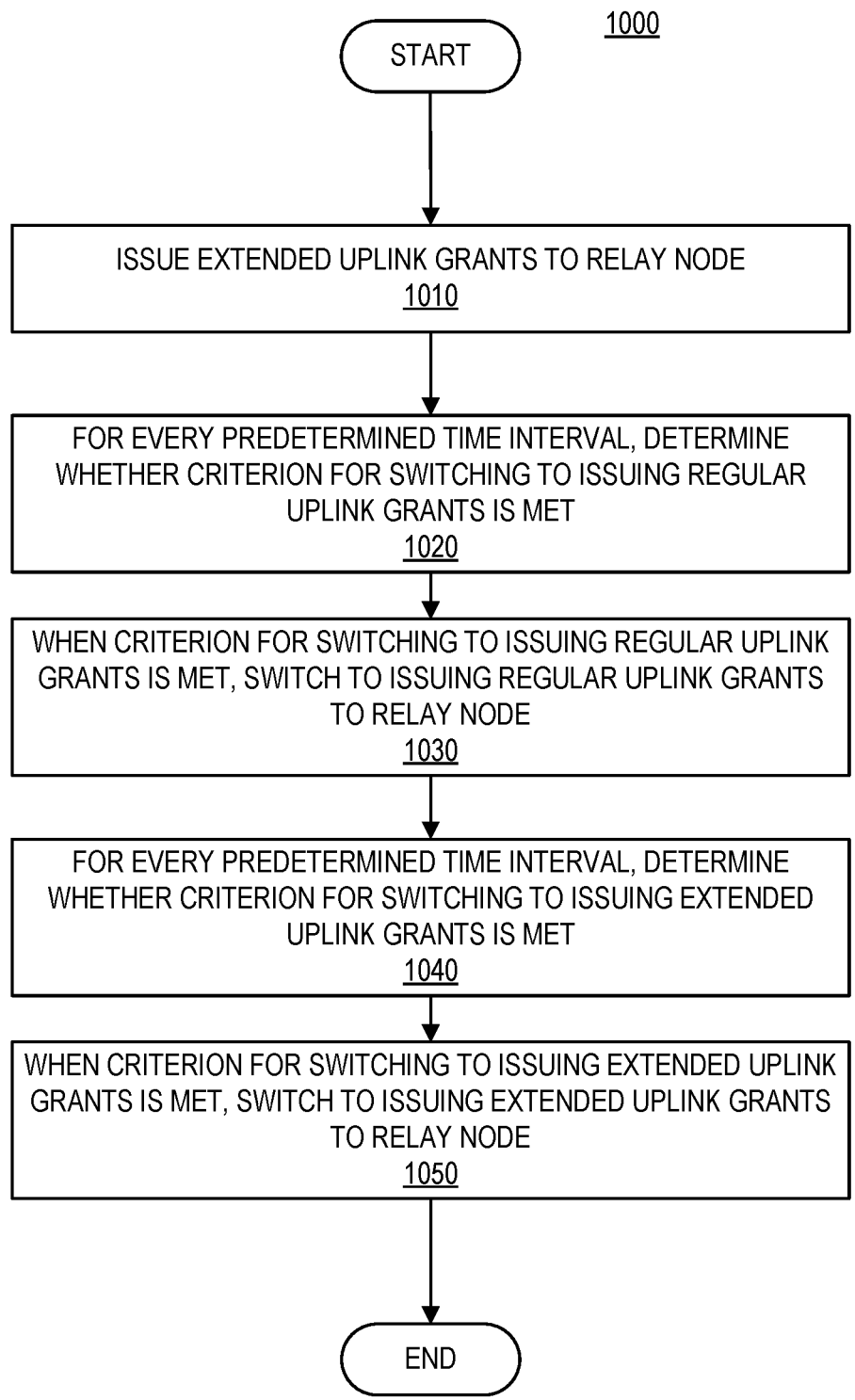
FIG. 10 depicts another exemplary method for allocating uplink resources to relay nodes in a wireless network, in accordance with the disclosed embodiments.

FIG. 10 is a flowchart illustrates an exemplary method for allocating uplink resources to relay nodes, in accordance with an embodiment of the present disclosure. Method 1000 may be performed by any suitable processor discussed herein, for example, a processor included in access node 110 (or 210, 310, 410), processor 510 included in processing node 500, or a processor included in control node 104. For discussion purposes, method 1000 is described as being performed by a processor included in access node 110, and the relay node is represented by relay node 120. Method 1000 may be performed after access node 110 has switched to or started issuing extended uplink grants. FIG. 10 illustrates an exemplary embodiment in which access node 110 dynamically switches between an uplink resource allocation scheme (by issuing extended uplink grants to a relay node)

and a regular uplink resource allocation scheme (by issuing regular uplink grants to a relay node). The dynamic switch may be triggered by analyzing one or more buffer status reports at every predetermined time interval. For example, access node 110 may analyze the current buffer status report at a 30-minute time interval to determine whether relay node 120 is serving GBR traffic. If relay node 120 is not serving GBR traffic, as indicated in the current buffer status report, access node 110 may switch from issuing extended uplink grants to issuing regular uplink grants. If access node 110 is already issuing regular uplink grants to relay node 120, when access node 110 determines at the predetermined time interval that relay node 120 is serving GBR traffic, access node 110 may switch from issuing regular uplink grants to issuing extended uplink grants.

Referring to FIG. 10, method 1000 may include issuing, by access node 110, extended uplink grants to relay node 120 (step 1010). For every predetermined time interval (e.g., 20 minutes, 30 minutes, 1 hour, etc.), access node 110 may determine whether criterion to switch to issuing regular uplink grants is met (step 1020). The criterion may be that relay node 120 is not currently serving GBR traffic as indicated in a current buffer status report, or that relay node 120 was not serving GBR traffic as indicated in previous N buffer status reports (N may be predetermined integer number, such as 1, 2, 3, etc.), or a combination of both. For example, access node 110 may analyze the current buffer status report to determine whether relay node 120 is not serving GBR traffic. In some embodiments, if a current buffer status report indicates relay node 120 is not serving GBR traffic, access node 110 may stop issuing extended uplink grants. In some embodiments, if a current buffer status report indicates relay node 120 is not serving GBR traffic, access node 110 may further analyze previous N (e.g., 1, 2, or 3) buffer status reports to determine whether relay node 120 was also not serving GBR traffic in previous buffer status reports. If the previous N buffer status reports indicate that relay node 120 was serving GBR traffic, access node 110 may continue to issue extended uplink grants. If the previous N buffer status reports indicate that relay node 120 was not serving GBR traffic, access node 110 may stop issuing extended uplink grants, and start issuing regular uplink grants to relay node 120.

When the criterion to switch to issuing regular uplink grants is met, access node 110 may switch to issuing regular uplink grants from issuing extended uplink grants (step 1030). While issuing regular uplink grants, access node 110 may continue to analyze one or more buffer status reports at the predetermined time interval to determine whether a criterion for switching to issuing extended uplink grants is met (step 1040). The criterion for switching from issuing regular uplink grants to issuing extended uplink grants may be that relay node 120 is currently serving GBR traffic, or that relay node 120 was serving GBR traffic in previous N buffer status reports, or a combination of both. When access node 110 determines that the criterion for switching to issuing extended uplink grants is met, access node 110 may stop issuing regular uplink grants and switch to issuing extended uplink grants to relay node 120 (step 1050). For example, when the current status report indicates that relay node 120 is serving GBR traffic, access node 110 may switch to issuing extended uplink grants from issuing regular uplink grants. In some embodiments, when the current status report does not indicate that the relay node 120 is serving GBR traffic, access node 110 may not switch to issuing extended uplink grants. In some embodiments, when the current status report does not indicate that the relay node 120 is serving GBR traffic, access node 110 may nevertheless switch to issuing extended uplink grants if the previous N buffer status reports indicate that relay node 120 was serving GBR traffic.

Figure 11:
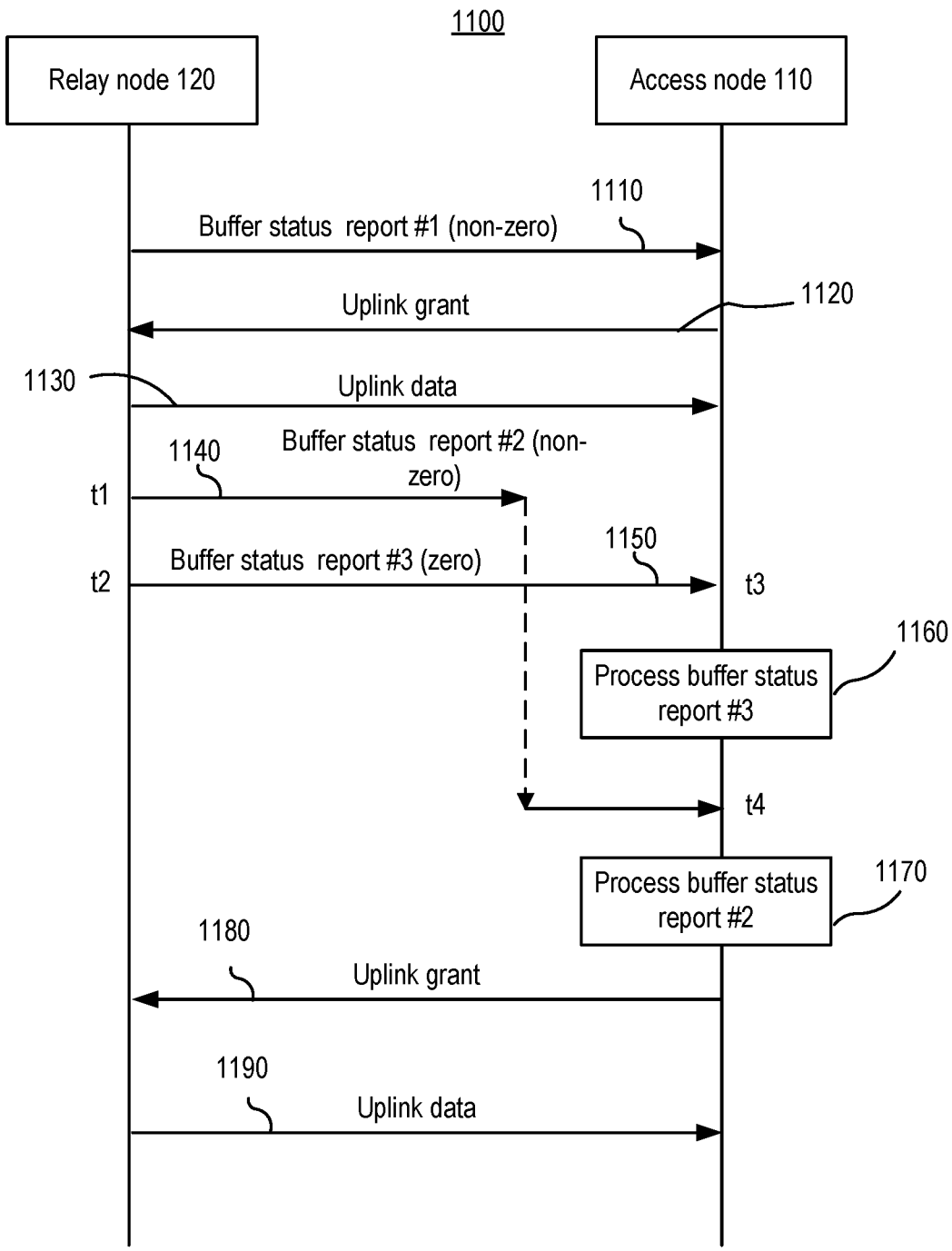
FIG. 11 depicts a conventional method for allocating uplink resources to relay nodes in a conventional wireless network.
Figure 12:
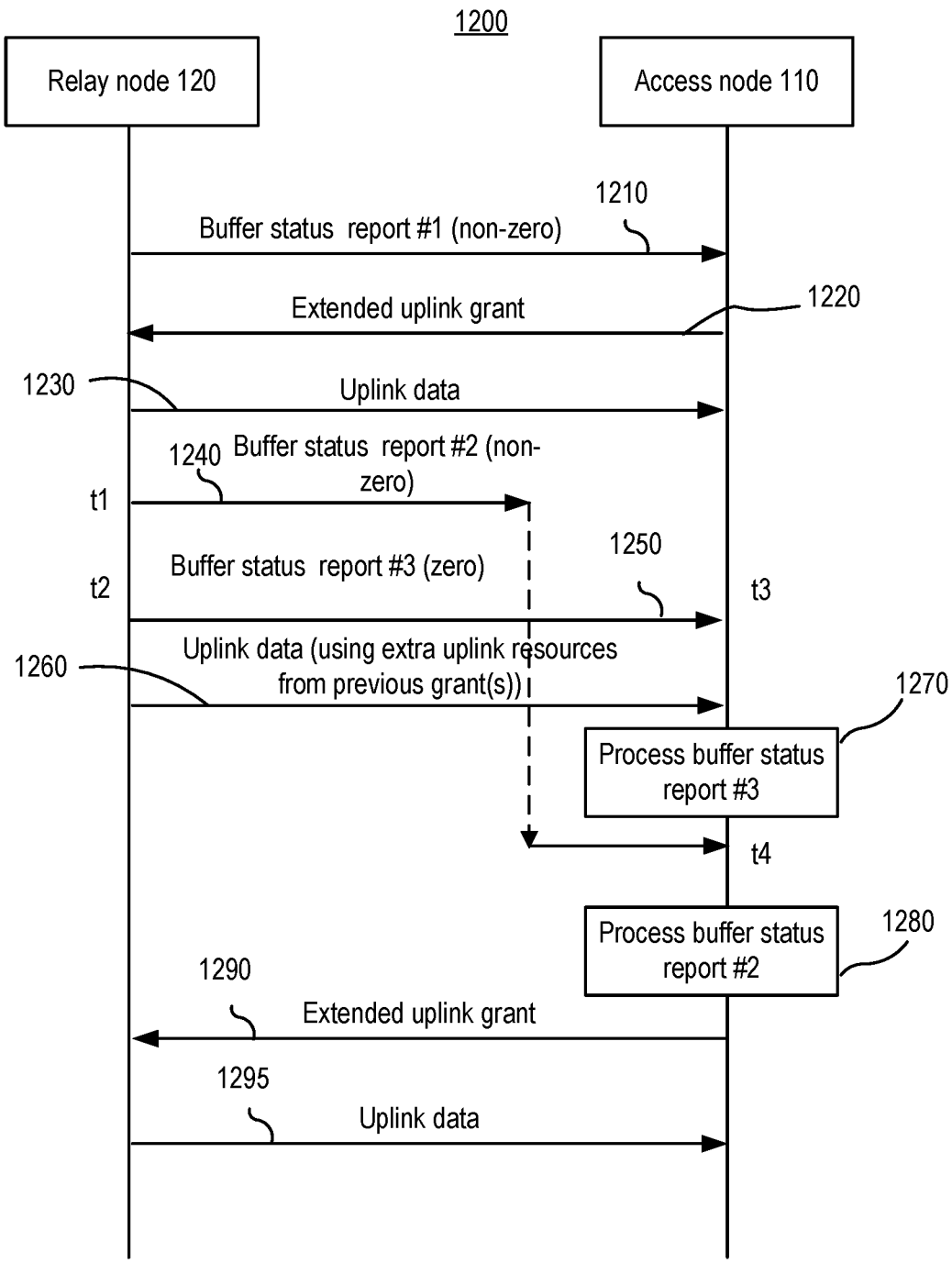
FIG. 12 depicts another exemplary method for allocating uplink resources to relay nodes in a wireless network, in accordance with the disclosed embodiments.

FIG. 11 illustrates another conventional uplink resource allocation scheme. FIG. 12 illustrates another extended uplink resource allocation scheme that issues extended uplink grants to a relay node, in accordance with an embodiment of the present disclosure. FIGS. 11 and 12 show the differences between the conventional uplink resource allocation scheme and the extended uplink resource allocation scheme using the scenario of out of order zero and non-zero buffer status reports as an example.

In the convention uplink resource allocation scheme shown in FIG. 11, when an earlier-sent non-zero buffer status report reaches access node 110 later than a later-sent zero buffer status report, the zero buffer status report is processed first before the non-zero buffer status report. Relay node 120 has to wait until the zero buffer status report is processed, the non-zero buffer status report is processed, and an uplink grant is issued before it can transmit data to access node 110. This wait time can increase the latency at relay node 120, making its performance unsatisfactory for some GBR traffic.

In the conventional method 1100 shown in FIG. 11, relay node 120 may send a buffer status report #1 (non-zero) to access node 110 (step 1110). Access node 110 may issue an uplink grant to relay node 120 (step 1120). Relay node 120 may transmit uplink data to access node 110 (step 1130). At time t1, relay node 120 may send a buffer status report #2 (non-zero) to access node 110 (step 1140). At time t2, relay node 120 may send a buffer status report #3 (zero) to access node 110 (step 1150), which may reach access node 110 at time t3. Due to various reasons, such as transmission problems, the earlier-sent buffer status report #2 may reach access node 110 at time t4, later than the later-sent buffer status report #3. Access node 110 may process the zero buffer status report #3 (step 1160) before processing the non-zero buffer status report #2 (step 1170). After processing the non-zero buffer status report #2, access node 110 may issue an uplink grant to relay node 120 (step 1180). Relay node 120 may transmit uplink data to access node 110 using the uplink resources allocated in the uplink grant (step 1190). In the conventional scheme, relay node 120 has to wait until the zero buffer status report #3 and the non-zero buffer status report #2 are processed and the uplink grant is issued (step 1180) before it can start transmitting data to access node 110 (step 1190). This time delay may increase the latency and degrade the performance of relay node 120 for GBR traffic.

To reduce the latency, the disclosed embodiments may issue extended uplink grants that have additional uplink resources such that relay node 120 may use the extra uplink resources to start transmitting data for a subsequent buffer status report without having to wait for the subsequent buffer status report to be processed by access node 110. FIG. 12 shows an exemplary method 1200 for allocating uplink resources to relay node 120, in accordance with an embodiment of the present disclosure. Method 1200 may be performed by any suitable processor discussed herein, for example, a processor included in access node 110 (or 210, 310, 410), processor 510 included in processing node 500, or a processor included in control node 104. For discussion purposes, method 1200 is described as being performed by a processor included in access node 110, and the relay node is represented by relay node 120.

As shown in FIG. 12, relay node 120 may send a non-zero buffer status report #1 to access node 110 (step 1210).

Access node 110 may issue an extended uplink grant to relay node 120 (step 1220). The extended uplink grant may include extra uplink resources. In one embodiment, the extra uplink resources may be additional resources than what relay node 120 is requesting for data indicated in the buffer status report. In some embodiments, the extra uplink resources may be additional resources determined by the size of data indicated in the non-zero buffer status report #1 and the available uplink resources or the utilization of the uplink resources. In some embodiments, the extra uplink resources may be 10%, 20%, 30%, or any other suitable percentage of the resources needed for the data size indicated in the non-zero buffer status report #1.

As shown in FIG. 12, relay node 120 may use the uplink resources allocated in the extended uplink grant to transmit data to access node (step 1230). The extra uplink resources may not have been used by relay node 120 for transmitting data in step 1230. At time t1, relay node 120 may send a non-zero buffer status report #2 to access node 110 (step 1240), and subsequently send a zero buffer status report #3 to access node 110 (step 1250). Due to various reasons, the non-zero buffer status report #2 may reach access node 110 later (at time t4) than the zero buffer status report #3 (at time t3). Compared to FIG. 11, instead of having to wait for the zero buffer status report #3 and non-zero buffer status report #2 to be processed and an uplink grant to be issued before transmitting uplink data to access node 110, relay node 120 may start transmitting data to access node 110 using the extra uplink resources allocated in one or more previous uplink grants (step 1260). Transmitting of uplink data (step 1260) may occur shortly after relay node 120 sends out the non-zero buffer status report #2. For example, in some embodiments, transmitting of uplink data (step 1260) may take place prior to the processing of the zero buffer status report #3 (step 1270). In some embodiments, transmitting of uplink data (step 1260) may take place after the processing of the zero buffer status report #3 and before the processing of the non-zero buffer status report #2 (step 1280). In some embodiments, relay node 120 may start transmitting data indicated in the non-zero buffer status report #2 using the extra uplink resources from one or more previous extended uplink grants before the non-zero buffer status report #2 is processed by access node 110, or before an uplink grant is issued in response to the non-zero buffer status report #2.

Still referring to FIG. 12, after the non-zero buffer status report #2 is processed by access node 110, access node 110 may issue an extended uplink grant to relay node 120 (step 1290). The extended uplink grant may include extra uplink resources that may be used by relay node 120 to transmit data indicated in one or more subsequent buffer status reports without having to wait for the one or more subsequent buffer status reports to be processed by access node 110. Relay node 120 may transmit uplink data to access node 110 (step 1295) using the uplink resources indicated in the extended uplink grant issued in step 1290, and/or any uplink resources from the previous uplink grants. Any extra uplink resources left over may be used for transmitting data indicated in other subsequent buffer status reports.

The embodiments shown in FIG. 9 and FIG. 12 may be combined. For example, in the scenario of lost buffer status reports shown in FIG. 9, each uplink grant may include extra uplink resources such that when the buffer status report #2 is sent out (which is lost in transmission), relay node 120 may use the extra uplink resources from previous one or more uplink grants to start transmitting data to access node 110 without having to wait for T ms (e.g., 320 ms) to send another buffer status report #3 and wait for an uplink grant from access node 110.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for allocating uplink resources in a wireless network, the system comprising:
    an access node configured to deploy a first radio air interface comprising a first number of uplink resources;
    a relay node configured to attach to the first radio air interface and to deploy a second radio air interface to which one or more end-user wireless devices are attached; one or more other end-user wireless devices attached to the first radio air interface; and
    a processor configured to:
        determine a type of traffic related to the one or more end-user wireless devices served by the relay node; and
        selectively issue an extended uplink grant to the relay node based on the type of traffic,
        wherein the extended uplink grant comprises at least one of:
            a second number of uplink resources greater than the first number of uplink resources, and
            a rate at which the second number of resources are allocated.

2. The system of claim 1, wherein the processor is configured to selectively issue the extended uplink grant only to the relay node attached to the first radio air interface, and not to the one or more other end-user wireless devices attached to the first radio air interface.

3. The system of claim 1, wherein the processor is configured to selectively issue the extended uplink grant only to the relay node when the type of traffic the relay node serves includes Guaranteed Bit Rate traffic, and not to the one or more other end-user wireless devices that are not served by the relay node.

4. The system of claim 1, wherein the second number of uplink resources comprises additional uplink resources for the relay node to use for transmitting data indicated in a buffer status report before another uplink grant is issued by the access node in response to processing the buffer status report.

5. The system of claim 1, wherein the second number of uplink resources comprises additional uplink resources for the relay node to use for transmitting data to the access node after the relay node transmits a buffer status report to the access node, wherein the relay node starts transmitting the data without waiting for the buffer status report to be processed, wherein the buffer status report is lost while being transmitted to the access node.

6. The system of claim 1, wherein the second number of uplink resources comprises additional uplink resources for the relay node to use for transmitting data indicated in an earlier-sent non-zero buffer status report that reaches the access node later than a later-sent zero buffer status report, before an uplink grant is issued by the access node in response to processing the non-zero buffer status report.

7. The system of claim 1, wherein the type of traffic served by the relay node includes Guaranteed Bit Rate (GBR) traffic and non-GBR traffic.

8. The system of claim 1, wherein the processor is further configured to selectively issue the extended uplink grant when the processor determines, based on a predetermined number of previous buffer status reports received from the relay node, that the type of traffic the relay node was serving includes Guaranteed Bit Rate traffic.

9. The system of claim 1, wherein the processor is further configured to selectively issue the extended uplink grant when the processor determines, based on a current buffer status report received from the relay node, that the type of traffic the relay node is serving includes Guaranteed Bit Rate traffic.

10. The system of claim 1, wherein the processor is further configured to:
analyze, at a predetermined time interval, a predetermined number of buffer status reports received from the relay node;
when the analysis indicates that the type of traffic the relay node serves includes Guaranteed Bit Rate (GBR) traffic, start issuing the extended uplink grant.

11. The system of claim 10, wherein the processor is further configured to:
analyze, at the predetermined time interval, a second predetermined number of buffer status reports received from the relay node; and
when the analysis indicates that the type of traffic the relay node serves does not include GBR traffic, stop issuing the extended uplink grant and switch to issuing regular uplink grants.

12. The system of claim 1, wherein issuing the extended uplink grant to the relay node includes repeatedly issuing a regular uplink grant at a predetermined time interval that is a fraction of a time period that the relay node would have to wait between two consecutive buffer status reports in a regular uplink resource allocation scheme.

13. A method for allocating uplink resources in a wireless network, the method comprising:
determining, by a processing node, a type of traffic related to one or more end-user wireless devices served by a relay node that is in wireless communication with an access node, wherein the access node is also in wireless communication with one or more other end-user wireless devices that are not served by the relay node; and
selectively issuing, by the processing node, an extended uplink grant to the relay node based on the type of traffic,
wherein issuing the extended uplink grant to the relay node includes repeatedly issuing a regular uplink grant at a predetermined time interval that is a fraction of a time period that the relay node would have to wait between two consecutive buffer status reports in a regular uplink resource allocation scheme.

14. The method of claim 13, wherein selectively issuing the extended uplink grant comprises selectively issuing the extended uplink grant only to the relay node and not to the one or more other end-user wireless devices that are not served by the relay node.

15. The method of claim 13, wherein selectively issuing the extended uplink grant comprises selectively issuing the extended uplink grant only to the relay node when the type of traffic includes Guaranteed Bit Rate (GBR) traffic, and not to the one or more other end-user wireless devices that are not served by the relay node.

16. The method of claim 13, wherein the extended uplink grant allocates additional uplink resources for the relay node to use for transmitting data indicated in a buffer status report before the buffer status report is processed by the access node.

17. The method of claim 13, wherein the extended uplink grant allocates additional uplink resources for the relay node to use for transmitting data to the access node after the relay node transmits a buffer status report to the access node, wherein the relay node starts transmitting the data without waiting for the buffer status report to be received, wherein the buffer status report is lost while being transmitted to the access node.

18. A processing node for allocating uplink resources in a wireless network, the processing node comprising:
a processor configured to:
determine a type of traffic related to one or more end-user wireless devices served by a relay node that is in wireless communication with an access node, wherein the access node is also in wireless communication with one or more other end-user wireless devices that are not served by the relay node; and
selectively issue an extended uplink grant to the relay node based on the type of traffic,
wherein issuing the extended uplink grant to the relay node includes allocating additional uplink resources than that included in a regular uplink grant the relay node would receive if the relay node were treated as if it were one of the one or more other end-user wireless devices.

19. The processing node of claim 18, wherein selectively issuing the extended uplink grant comprises selectively issuing the extended uplink grant only to the relay node when the type of traffic includes Guaranteed Bit Rate (GBR) traffic, and not to the one or more other end-user wireless devices that are not served by the relay node.

* * * * *